US012746930B2

(12) United States Patent
Nacken et al.

(10) Patent No.: US 12,746,930 B2
(45) Date of Patent: Sep. 29, 2026

(54) VEHICLE DATA SYSTEM AND METHOD FOR DETERMINING RELEVANT OR TRANSMISSION-SUITABLE VEHICLE DATA FROM AN ENVIRONMENT-SENSING SENSOR

(71) Applicant: Continental Autonomous Mobility Germany GmbH, Ingolstadt (DE)

(72) Inventors: Karl Matthias Nacken, Lindau (DE); Michelle Karg, Lindau (DE); Armin Staudenmaier, Hörbranz (DE)

(73) Assignee: CONTINENTAL AUTONOMOUS MOBILITY GERMANY GMBH, Ingolstadt (DE)

( * ) Notice: Subject to any disclaimer, the term of this patent is extended or adjusted under 35 U.S.C. 154(b) by 104 days.

(21) Appl. No.: 18/719,761

(22) PCT Filed: Dec. 12, 2022

(86) PCT No.: PCT/DE2022/200295
§ 371 (c)(1),
(2) Date: Jun. 13, 2024

(87) PCT Pub. No.: WO2023/110034
PCT Pub. Date: Jun. 22, 2023

(65) Prior Publication Data

US 2025/0042409 A1 Feb. 6, 2025

(30) Foreign Application Priority Data

Dec. 14, 2021 (DE) ..................... 10 2021 214 334.2

(51) Int. Cl.
*B60W 40/02* (2006.01)
*G06V 10/82* (2022.01)
(Continued)

(52) U.S. Cl.
CPC ............. *B60W 40/02* (2013.01); *G06V 10/82* (2022.01); *G06V 20/56* (2022.01); *H04W 4/44* (2018.02);
(Continued)

(58) Field of Classification Search
CPC ................................ B60W 40/02; H04W 4/44
See application file for complete search history.

(56) References Cited

U.S. PATENT DOCUMENTS 10,552,727 B2 * 2/2020 Caspi ....................... G06N 3/08
10,909,419 B2 * 2/2021 Itou ..................... G06F 11/0754
(Continued)

FOREIGN PATENT DOCUMENTS

DE 10 2019 127 229 A1 4/2020
DE 10 2019 209 565 A1 12/2020
(Continued)

OTHER PUBLICATIONS

Andrea Stocco, Misbevhiour Predicition for Autonomous Driving Systems, Published on Oct. 10, 2019, Taken from the IDS from Applicant. pp. 1-12. (Year: 2019).*
(Continued)

*Primary Examiner* — Jess Whittington
(74) *Attorney, Agent, or Firm* — Buchanan Ingersoll & Rooney PC

(57) ABSTRACT

A vehicle data system and method for determining transmission-suitable vehicle data from an environment-sensing sensor during vehicle operation are disclosed. An environment detection system evaluates input data from the environment-sensing sensor using a first trained artificial neural network to generate environment detection data for controlling vehicle operation. A monitor system evaluates the same input data using a second trained artificial neural network different from the first and generates reconstruction data.
(Continued)

The monitor system establishes a deviation between the reconstruction data and the input data and, when the deviation exceeds a threshold value during vehicle operation, triggers transmission of the input data to a separate data unit for storage. The disclosed configuration enables identification and targeted collection of scenarios insufficiently represented during development or training of the environment detection system.

19 Claims, 5 Drawing Sheets

(51) Int. Cl.
*G06V 20/56* (2022.01)
*H04W 4/44* (2018.01)

(52) U.S. Cl.
CPC ... *B60W 2420/403* (2013.01); *B60W 2556/45* (2020.02)

(56) References Cited

U.S. PATENT DOCUMENTS

| | | | | |
|---|---|---|---|---|
| 11,636,348 | B1 * | 4/2023 | Tang | G06N 7/01 706/16 |
| 11,803,732 | B2 * | 10/2023 | Hanselmann | G06N 3/0455 |
| 2017/0169357 | A1 * | 6/2017 | Caspi | G06N 3/08 |
| 2017/0255966 | A1 | 9/2017 | Khoury | |
| 2020/0063315 | A1 * | 2/2020 | Yoon | G06N 3/088 |
| 2020/0117912 | A1 | 4/2020 | Thompson et al. | |
| 2020/0250812 | A1 | 8/2020 | Ceccaldi et al. | |
| 2020/0286464 | A1 * | 9/2020 | Kurata | G10L 15/063 |
| 2021/0286923 | A1 * | 9/2021 | Kristensen | G06N 3/096 |
| 2021/0300422 | A1 * | 9/2021 | McGill | B60W 30/18154 |
| 2021/0357701 | A1 | 11/2021 | Hyuga et al. | |
| 2022/0215378 | A1 * | 7/2022 | Dhama | G06Q 20/382 |
| 2022/0222929 | A1 | 7/2022 | Gauerhof et al. | |
| 2022/0390961 | A1 * | 12/2022 | Laszlo | G06N 3/09 |
| 2023/0004797 | A1 * | 1/2023 | Chiu | G06N 3/094 |
| 2023/0386219 | A1 | 11/2023 | Morimoto et al. | |
| 2024/0012405 | A1 * | 1/2024 | Romer | G05B 23/0229 |
| 2025/0356586 | A1 * | 11/2025 | Otto | G06N 20/00 |
| 2025/0377988 | A1 * | 12/2025 | Morand | G06F 11/1476 |
| 2026/0004119 | A1 * | 1/2026 | Staudenmaier | G06N 3/08 |

FOREIGN PATENT DOCUMENTS

| | | | |
|---|---|---|---|
| DE | 10 2019 124 257 | A1 | 3/2021 |
| DE | 10 2020 205 315 | A1 | 10/2021 |
| DE | 10 2021 213 392 | A1 | 6/2023 |
| EP | 3 961 511 | A1 | 3/2022 |
| JP | 2019-021201 | A | 2/2019 |
| JP | 2019-139277 | A | 8/2019 |
| JP | 6972444 | B1 | 11/2021 |
| WO | 2016/132468 | A1 | 8/2016 |
| WO | 2020/056331 | A1 | 3/2020 |
| WO | 2020/098708 | A1 | 5/2020 |

OTHER PUBLICATIONS

Office Action (Notice of Reasons for Refusal) issued Jun. 4, 2025, by the Japan Patent Office in corresponding Japanese Patent Application No. 2024-531112 and an English translation of the Office Action. (9 pages).

Alain et al., "What Regularized Auto-Encoders Learn from the Data-Generation Distribution" Journal of Machine Learning Research, (Month unknown 2014), vol. 15, Issue 1, pp. 3743-3773.

Gal et al., "Bayesian Convolutional Neural Networks with Bernoulli Approximate Variational Inference", Under review as a conference paper at ICLR 2016, (Jan. 18, 2016), pp. 1-12.

Guo et al., "On Calibration of Modern Neural Networks", ICML'17: Proceedings of the 34th International Conference on Machine Learning, (Aug. 2017), vol. 70, pp. 1321-1330.

Kamyshanska et al., "On Autoencoder Scoring", Conference: ICML, (Jan. 2013), 9 pages.

Kendall et al., "What Uncertainties Do we Need in Bayesian Deep Learning for Computer Vision?", 31st Conference on Neural Information Processing Systems (NIPS 2017), (Dec. 2017), pp. 5580-5590.

Lakshminarayanan et al., "Simple and Scalable Predictive Uncertainty Estimation using Deep Ensembles", 31st Conference on Neural Information Processing Systems (NIPS 2017), (Dec. 2017), pp. 6405-6416.

Lohdefink et al., "Self-Supervised Domain Mismatch Estimation for Autonomous Perception", 2020 IEEE/CVF Conference on Computer Vision and Pattern Recognition Workshops (CVPRW), (Jun. 2020), pp. 1359-1368.

McAllister et al., "Concrete Problems for Autonomous Vehicle Safety: Advantages of Bayesian Deep Learning", Proceedings of the Twenty-Sixth International Joint Conference on Artificial Intelligence (IJCAI-17), (Aug. 2017), pp. 4745-4753.

McClure et al., "Robustly Representing Uncertainty Through Sampling in deep Neural Networks", Second workshop on Bayesian Deep Learning (NIPS 2017), (Jan. 2018), pp. 1-14.

Sharifipour et al., "Unsupervised Feature Ranking and Selection Based on Autoencoders", ICASSP 2019—2019 IEEE International Conference on Acoustics, Speech and Signal Processing (ICASSP), Brighton, UK, (May 2019), pp. 3172-3176.

Stocco et al., "Misbehaviour Prediction for Autonomous Driving Systems", 2020 IEEE/ACM 42nd International Conference on Software Engineering (ICSE), Seoul, Korea (South), (Oct. 2020), pp. 359-371.

Yoshihashi et al., "Classification-Reconstruction Learning for Open-Set Recognition", 2019 IEEE/CVF Conference on Computer Vision and Pattern Recognition (CVPR), Long Beach, CA, USA, (Jun. 2019), pp. 4011-4020.

Yoshihashi et al., "Classification-Reconstruction Learning for Open-Set Recognition", 2019 IEEE/CVF Conference on Computer Vision and Pattern Recognition (CVPR), Long Beach, CA, USA, (Jun. 2019), pp. 4016-4025.

Office Action (Notice of Reasons for Refusal) issued Apr. 2, 2025, by the Japan Patent Office in corresponding Japanese Patent Application No. 2024-525881 and an English translation of the Office Action. (11 pages).

Notice of Allowance (Decision to Grant a Patent) issued Jun. 11, 2025, by the Japan Patent Office in corresponding Japanese Patent Application No. 2024-525881 and an English translation of the Notice of Allowance. (3 pages).

Office Action (Request for the Submission of an Opinion) issued Mar. 11, 2026, by the Korean Intellectual Property Office in corresponding Korean Patent Application No. 10-2024-7016523 and an English translation with the Concise Statement of Relevance of the Office Action. (22 pages).

German Search Report dated Oct. 31, 2022 for the priority German Patent Application No. 10 2021 213 392.4. (10 pages).

The International Search Report and the Written Opinion of the International Searching Authority mailed on Feb. 9, 2023, for the counterpart PCT Application No. PCT/DE2022/200275. (18 pages).

* cited by examiner

VEHICLE DATA SYSTEM AND METHOD FOR DETERMINING RELEVANT OR TRANSMISSION-SUITABLE VEHICLE DATA FROM AN ENVIRONMENT-SENSING SENSOR

CROSS-REFERENCE TO RELATED APPLICATIONS

The present application is a National Stage Application under 35 U.S.C. § 371 of International Patent Application No. PCT/DE2022/200295 filed on Dec. 12, 2022, and claims priority from German Patent Application No. 10 2021 214 334.2 filed on Dec. 14, 2021, in the German Patent and Trademark Office, the disclosures of which are herein incorporated by reference in their entireties.

TECHNICAL FIELD

The invention relates to a vehicle data system and a method for determining transmission-suitable vehicle data from an environment-sensing sensor and can be used, for example, in the context of enhancing systems for assisted or automated driving.

BACKGROUND

The prior art includes the training of networks for detection functions and for vehicle functions based on training data which are run in, for example, by test vehicles during development. This restricts the data to scenarios which have occurred during the development. It is advantageous to collect data during the real operation of vehicles to secure comprehensive coverage of road traffic scenarios. This makes it possible to select training data from a wide-ranging diversity of data.

Data acquisition with test vehicles during development covers the scenarios acquired during the development. However, further scenarios occur during operation in production vehicles, which are insufficiently or scarcely covered by the scenarios during development. These are in particular edge cases (this means borderline cases, exceptional cases, individual cases or special cases which occur so infrequently that they are typically not acquired by test vehicles or only occasionally). In order to develop artificial intelligence (AI) which also addresses the edge cases, data acquisition during real operation is helpful to AI. In order to reduce the amount of data to be transmitted to subsequent development, it is necessary to select data in the vehicles. In this case, it is advantageous to keep the computing effort for the data selection as low as possible, since the budget for this on the embedded systems in the vehicles is limited.

Consequently, a method is advantageous which requires little computing time in order to assess the relevance of road traffic scenarios to the development of AI algorithms for ADAS and AD in production vehicles.

A general method for obtaining training data from production vehicles is described in WO 2020/056331 A1 for individual sensors.

Located in the vehicle is an artificial neural network which evaluates sensor data. A trigger classifier is applied to an intermediate result of the neural network in order to ascertain a classifier score for the sensor data. Based at least in part on the classifier score, a decision is made whether to transmit via a computer network at least a portion of the sensor data. In the event of a positive decision, sensor data are transmitted and used to generate training data.

SUMMARY

It is an aspect of the present disclosure to provide an optimized possibility for efficiently collecting relevant data from vehicles.

One aspect relates to the identification of relevant samples and edge cases from vehicle fleets for data-based algorithmics or a data-driven optimization of machine learning systems and methods.

A vehicle data system according to the present disclosure includes an environment detection system and a monitor system in the vehicle.

The environment detection system is configured to receive and evaluate input data X from an environment-sensing sensor. The input data X are evaluated by means of a first trained artificial neural network K, and environment detection data Y' are output as the result of the evaluation.

The monitor system is configured to evaluate the same input data X from the environment-sensing sensor by means of a second trained artificial neural network $K_R$, and reconstruction data X' are output as the result of the evaluation.

If the monitor system establishes a deviation exceeding a threshold value between the reconstruction data X' and the input data X (→potential edge case), the monitor system prompts a transmission of the input data X to a separate data unit. The separate data unit can, for example, be an external server, cloud storage or a backbone of a V2X system. V2X, vehicle-to-X, means a communication system or telematics system in which the vehicle communicates with other participants.

In one exemplary embodiment, the second artificial neural network $K_R$ is an autoencoder.

The "non-safety-critical" (monitoring) system described is realized by an autoencoder. This is developed based on the same input data as the detection algorithm under consideration or function. Due to its functional principle, the autoencoder offers a significant advantage over possible other approaches.

This is illustrated using the example of image data as the sensor data:

If an image is given to the autoencoder, it tries to reconstruct the image in the output. Consequently, the autoencoder can be trained exclusively with the input signal without using additional labels. On the one hand, this offers the advantage that there is no additional outlay in annotation terms and, on the other hand, offers the decisive advantage that an error can be determined in a quantified manner at any time (even on unknown data) in relation to the input data. In this case, there is the possibility of suitable thresholding. The autoencoder can be applied to the entire image or to partial sections.

Consequently, the autoencoder can measure its own error with every possible input signal. In general, higher error values are to be expected with machine learning methods in input data which do not sufficiently match the training data. The fact that the autoencoder and the detection function are based on the same data results in the following advantage: unknown or uncertain scenarios identified by the autoencoder indicate that these scenarios are insufficiently contained in the training data and, consequently, are relevant to a wide-reaching coverage of traffic scenarios in function development.

According to one embodiment, the monitor system calculates a score which estimates a relevance of the input data X based on the deviation.

In one exemplary embodiment, the first artificial neural network K has been trained on the basis of predefined training data, wherein nominal output data Y_1, Y_2, . . . , Y_n have been used in each case regarding input data X_1, X_2, . . . , X_n. A first error function has been minimized by adjusting weights of the first neural network K, which indicates deviations between outputs of the first neural network K for input data X_1, X_2, . . . , X_n from corresponding nominal output data Y_1, Y_2, . . . , Y_n.

According to one embodiment, the second artificial neural network $K_R$ has been trained by adjusting weights of the second neural network $K_R$, wherein a second error function has been minimized, which indicates the deviation between reconstruction data X' and input data X from the environment-sensing sensor.

In one exemplary embodiment, in addition to the input data X from the environment-sensing sensor, meta information is transmitted. Meta information corresponds to one or more items of information from the following group: current software version, calculated scores of the monitor system, GPS data, date, time, vehicle identification number (VIN) and cloud data, which make it possible to reproduce the scene and/or the vehicle situation.

Based hereon, the scene can be precisely reconstructed in development, for example (simulation with the same software version). Thanks to this information gain, unknown scenarios and edge cases can be selected and can flow directly into the development process of the vehicle or environment detection function. As a result, a continual quality assurance process can be established. With each development step, more and more relevant data flow into the system.

Additionally, the degree of maturity of the software can also be derived from the number of incoming data transmissions. The lower the number of data transmission processes by virtue of insufficiently accurate predictions, the higher the degree of maturity of the software.

According to one embodiment, the environment detection system is configured to receive input data X from a plurality of environment-sensing sensors and to evaluate these jointly.

This corresponds to a multi-sensor setup. The advantage of multi-sensor systems is that they increase the certainty of detection algorithms for road traffic by verifying the detections of multiple environment-sensing sensors. For example, multi-sensor systems can be any combination of:

- one or more cameras,
- one or more radars,
- one or more ultrasonic systems,
- one or more lidars,
- and/or one or more microphones.

In this case, a multi-sensor system includes at least two sensors. The data acquisition of one of these sensors s at time t can be designated with D_(s,t). The data D can be images and/or audio recordings, as well as measurements of the angle, distance, speed and reflections of objects in the environment.

In one exemplary embodiment, the monitor system is configured to process the input data X from the environment-sensing sensor parallel to the environment detection system.

According to one embodiment, the monitor system is integrated in the environment detection system as an additional detector head. The monitor system and the environment detection system utilize a common encoder.

In one exemplary embodiment, the input data from the environment-sensing sensor are image data. The monitor system is configured to reconstruct the entire image or a partial section of the image. Additionally, it can estimate and output a value for the error of the reconstruction.

According to one embodiment, the monitor system is configured to ascertain and output an uncertainty measure. The uncertainty measure indicates how certain the monitor system is during the output of its reconstruction data X'.

In one exemplary embodiment, the monitor system is configured to take account of a temporal consistency of the reconstruction data X'.

According to one embodiment, a distinction is made as to whether a deviation between the reconstruction data X' from the monitor system and the input data X occurs continually or only for limited periods of time.

In one exemplary embodiment, the environment detection system and the monitor system are configured in such a way that both are capable of being updated over the air.

A further subject-matter of the present disclosure relates to a method for determining transmission-suitable vehicle data from an environment-sensing sensor. The method includes the following steps:

- evaluation of input data X from the environment-sensing sensor by an environment detection system by means of a first trained artificial neural network;
- outputting of the environment detection data Y' determined during the evaluation;
- evaluation of the same input data X from the environment-sensing sensor by a monitor system by means of a second trained artificial neural network $K_R$;
- outputting of the reconstruction data X' determined during the evaluation; and
- prompting of a transmission of the input data X to a separate data unit if a deviation exceeding a threshold value between the reconstruction data X' and the input data X is established.

Furthermore, the assessment of the relevance of traffic scenarios can be improved by taking account of multi-sensor setups, the temporal progress, and the estimation of certainty with which a network predicts an output. Furthermore, a low computing time outlay for embedded systems is advantageous.

BRIEF DESCRIPTION OF THE DRAWINGS

These points are addressed, e.g., by choosing a monitor system which requires little computing effort or an autoencoder approach and expanding the latter for multi-sensor systems to include confidence estimates and temporal verification.

Exemplary embodiments and figures are explained in greater detail below, wherein.

DETAILED DESCRIPTION

Figure 1:
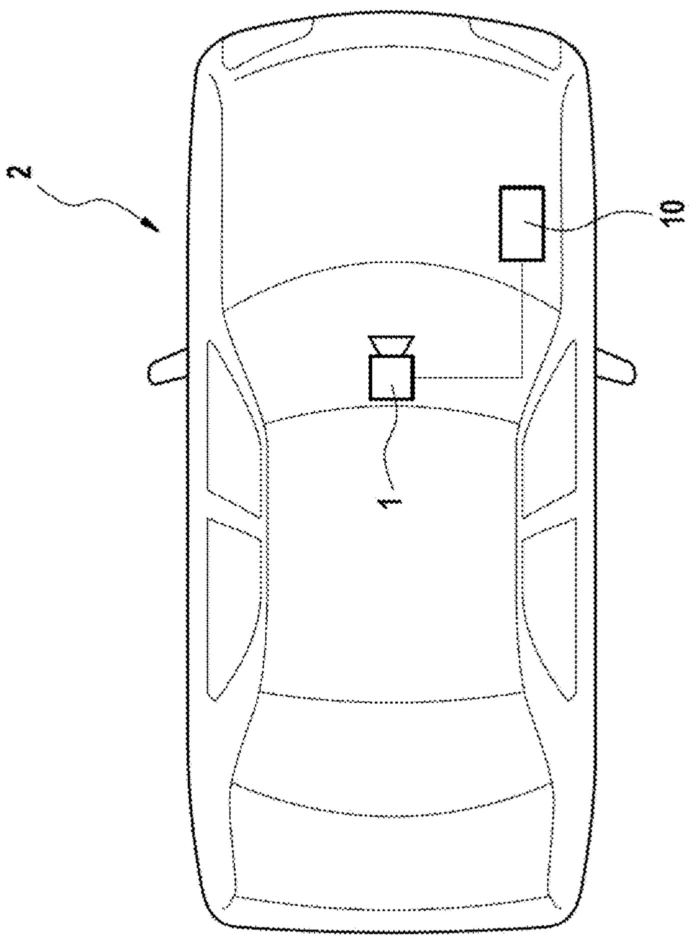
FIG. 1 shows a vehicle having an environment-sensing sensor and a data system.

FIG. 1 shows a vehicle 2 having an environment-sensing sensor 1 and a data system 10. The depicted environment-sensing sensor 1 corresponds to a camera which is arranged inside the vehicle 2—for instance, in the region of the rear-view mirror—and which senses the environment of the vehicle through the windshield of the vehicle 2. Further environment-sensing sensors 1 of the vehicle 2 can be, for example, camera, radar, lidar and/or ultrasonic sensors (not depicted). All of the environment-sensing sensors 1 record data which contain information about the environment of the vehicle 2. The data are transmitted to the data system 10 of the vehicle and processed by the latter. The data system can, for example, include a controller, e.g., a controller for assisted or automated driving (ADAS or AD, e.g., an Automated Driving Control Unit, ADCU), which derives detections from the sensor data and gains a certain understanding of the vehicle environment and the traffic situation. By virtue of these detections, warnings can be sent to the driver or limited interventions can be made in the vehicle control during assisted driving; during automated driving, an ADCU can exercise control over the vehicle 2 as a whole.

Figure 2:
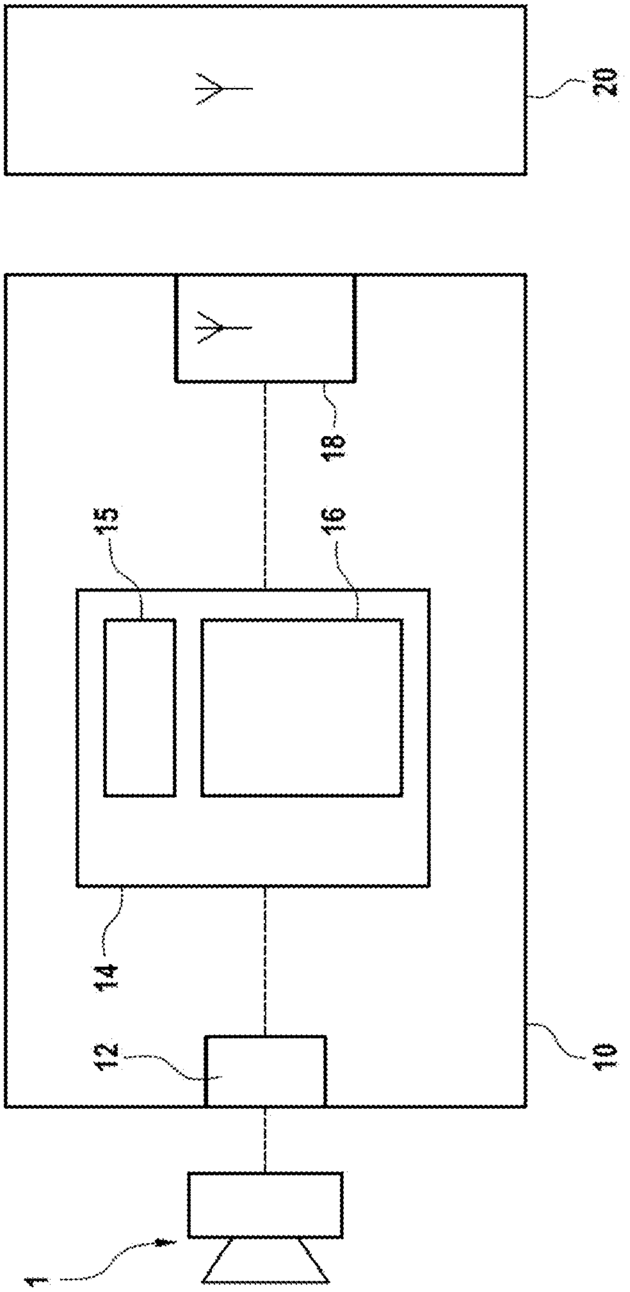
FIG. 2 shows an environment-sensing sensor, a data system and a separate data unit.

FIG. 2 shows an environment-sensing sensor 1, a data system 10 and a separate data unit 20.

The data system 10 is electrically connected to at least one environment-sensing sensor 1, e.g., an image acquisition device, in a vehicle 2. The image acquisition device can be a front camera of a vehicle. The front camera serves as a sensor for acquiring the environment which lies in front of the vehicle. The environment of the vehicle 2 can be detected based on the signals or image data from the front camera. Based on the environment detection, ADAS or AD functions can be provided by an ADAS/AD control unit, e.g., lane recognition, lane departure warning system, traffic sign recognition, speed limit assistance, road user recognition, collision warning, emergency braking assistance, adaptive cruise control, construction site assistance, a highway pilot, a Cruising Chauffeur function and/or an autopilot.

The image acquisition device typically includes an optical system or a lens and an image acquisition sensor, e.g., a CMOS sensor.

The data or signals sensed by the environment-sensing sensor 1 are transmitted to an input interface 12 of the data system 10. The data are processed in the data system 10 by a data processor 14. The data processor 14 includes an environment detection system 16 and a monitor system 15. The environment detection system 16 can include a first artificial neural network, for example a CNN. In addition to pure detections, the environment detection system 16 can also create a more comprehensive understanding of the environment and situation, for example a prediction of trajectories of the ego vehicle 2 but also of other objects or road users in the environment of the vehicle 2. The detections of the environment detection system 16 can be relevant to safety because actions or warnings of an ADAS or AD system of the vehicle are dependent on them. On the other hand, the monitor system 15 is not safety-critical, since its main task is to monitor the environment detection system 16 and to decide whether data should be transmitted to a separate data unit 20 or not. The monitor system 15 can include a second artificial neural network, for example an autoencoder.

In order for the artificial neural networks to process the data in the vehicle in real time, the data system 10 or the data processor 14 can include one or more hardware accelerators for artificial neural networks.

If there is a deviation exceeding, e.g., a threshold value between the detection of the monitor system 15 and the detection of the environment detection system 16, then the data system 10 carries out a wireless transmission of the data to a separate data unit 20 (cloud, backbone, infrastructure, etc.) via an output interface 18.

Figure 3:
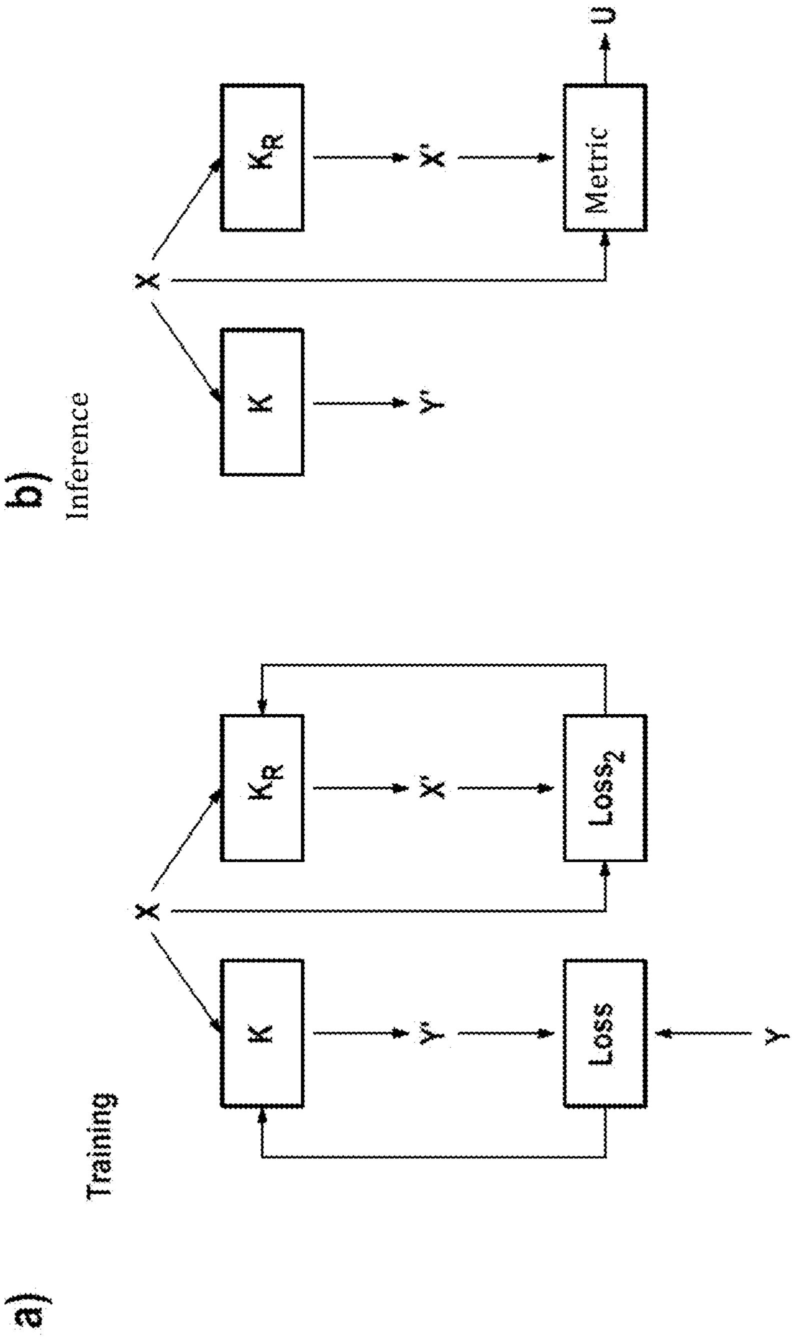
FIG. 3 shows an exemplary embodiment of a classification system as an environment detection system and a monitor system.

FIG. 3 shows one exemplary embodiment of a classification system as an environment detection system and a monitor system.

The classification system K classifies, e.g., objects on the basis of sensor data X from the environment-sensing sensor 1. In addition to the classification system K, a second independent and additional monitor system $K_R$ is introduced.

FIG. 3*a* shows a flow chart of an exemplary embodiment of a method for training a classification system K and a monitor system by means of machine learning. During training, both systems are trained with the same sensor data X.

In order to train the classification system K which is, for example, a decision-tree learning system, a support vector machine, a learning system based on regression analysis, a Bayesian network, a neural network or a convolutional neural network, training input data X and training target values Y are provided. Output data Y' are generated from the training input data X by means of the classification system K. Reconstruction data X' which are similar to the training input data X are generated from the training input data X by means of the monitor system $K_R$ (autoencoder). The objective of the training of the classification system K is that the output data Y' are as similar as possible to the training target values Y without carrying out overfitting.

To this end, the deviations still present between the output data Y' and the training target values Y are determined from the generated output data Y' and the training target values Y by means of a first error function loss. These deviations are used, for example, for an adjustment of parameters of the classification system K via backpropagation. This is repeated until such time as a predefined match has been attained or until signs of overfitting occur.

The monitor system $K_R$ is based on an autoencoder and does not therefore need any further annotations apart from the actual sensor data X. The objective of the training of the monitor system $K_R$ is that the reconstruction data X' are as similar as possible to the training input data X. To this end, the deviations still present between the reconstruction data X' and the training input data X are determined from the generated reconstruction data X' and the training input data X by means of a second error function $loss_2$. These deviations are used, for example, for an adjustment of parameters of the monitor system $K_R$ via backpropagation. This is repeated until such time as a predefined match has been attained or until signs of overfitting occur.

The monitor system $K_R$ can also be trained, for example, following the training of the classification system K, wherein it must be noted that the same training input data X must be used.

The autoencoder or the monitor system $K_R$ can compare its output regarding the original sensor data at any time and calculate (by means of a metric) a quantified error or a quantified uncertainty U. The deviation between the reconstruction data X' and the input data X is ascertained by means of a metric. The deviation value ascertained in this way quantifies the uncertainty U of the output data Y'.

FIG. 3*b* shows a flow chart of a method for applying the classification system K and the monitor system $K_R$ which is suitable for the exemplary embodiment in FIG. 3*a*. It makes it possible to quantify uncertainties U in the output data Y' from the classification system K.

The advantage of this principle is that the monitor system $K_R$ can itself measure the error in its reconstruction data X' in relation to the input signal or the input data X in the application (inference) by means of the metric, and can do so at any time.

Since both the classification system K and the monitor system $K_R$ have been developed on the same data, both systems have comparable deficits. However, since the deficits in the output data Y' in the case of the classification system K can no longer be measured in the application, they can be identified from the relation with the monitor system $K_R$.

By way of example, let the input data X be image data of an image and the output data Y' be classification data which correspond to objects depicted in the image. If it is now possible to generate a reconstructed image X' by means of the monitor system $K_R$, which is similar to the original image X, then this indicates that similar input data X were already present during the training of the monitor system $K_R$ and the classification system K so that the uncertainty U of the output data Y' is small. If, however, the reconstructed image X' is very different from the original image X, then this indicates that no similar input data X have been used to train the monitor system $K_R$ and the classification system K and, accordingly, the uncertainty U of the output data Y' is large.

Consequently, a large uncertainty U is an indication that the incoming or input data could be an edge case.

Figure 4:
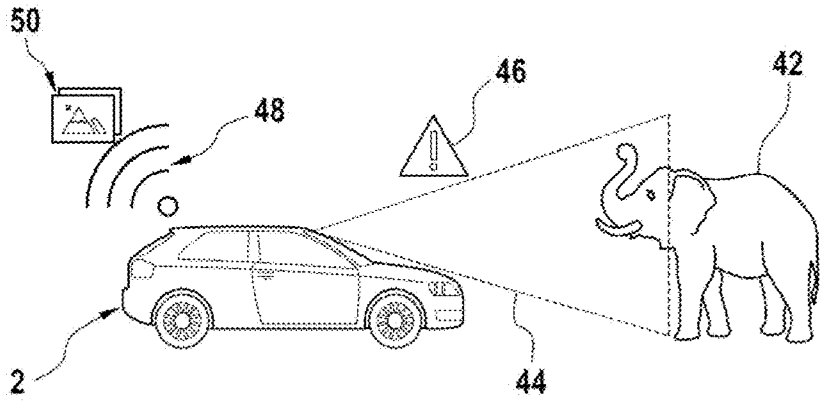
FIG. 4 shows a vehicle which senses an unknown scene/situation.

FIG. 4 schematically shows a vehicle 2 which senses an unknown scene/situation. An unusual object 42, namely an elephant, is located in the sensing range 44 of the environment-sensing sensor of the vehicle. During the application of the trained systems, a situation now arises which has not been sufficiently illustrated during development, since the training data did not contain an elephant as a unusual object 42. This borderline situation can be identified by the monitor system $K_R$, symbolized by the exclamation mark or attention! symbol 46 in FIG. 4. The data sensed by the environment-sensing sensor can subsequently be used in order to enhance the detection system. To this end, the data can be transmitted wirelessly, for example via a telematics device 48, to an external data unit, e.g., to a server or to a cloud 50. Within the framework of a possible development process, the data stored in the cloud can be used in order to be prepared for such borderline cases in future as well by means of optimized training.

A multiplicity of data which is not adequately represented in the training data can be identified with this system. Data which are not adequately represented can be caused by limitations of the environment-sensing sensor in particular driving situations, but also simply by unusual environment scenarios.

Figure 5:
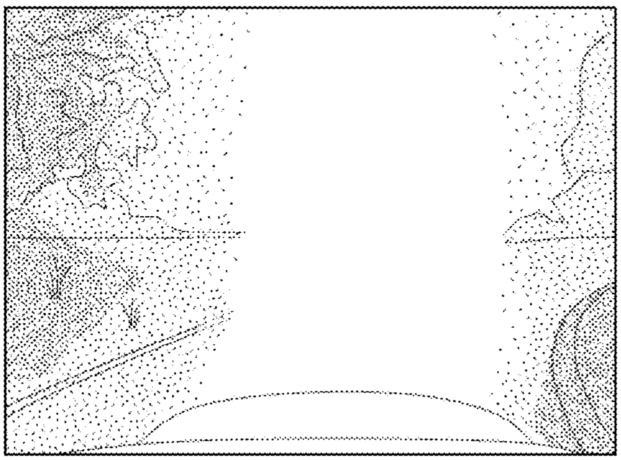
FIG. 5 shows a grayscale image from a vehicle camera which has overexposure by virtue of incorrect exposure control.

FIG. 5 schematically shows a grayscale image from a vehicle camera, which has overexposure by virtue of incorrect exposure control. In most cases, it will not be possible to classify this too bright and low-contrast image. Such a situation frequently occurs in similar driving situations by virtue of the limitations of exposure control, e.g., briefly when exiting a tunnel. The cause here is sensory in nature.

Figure 6:
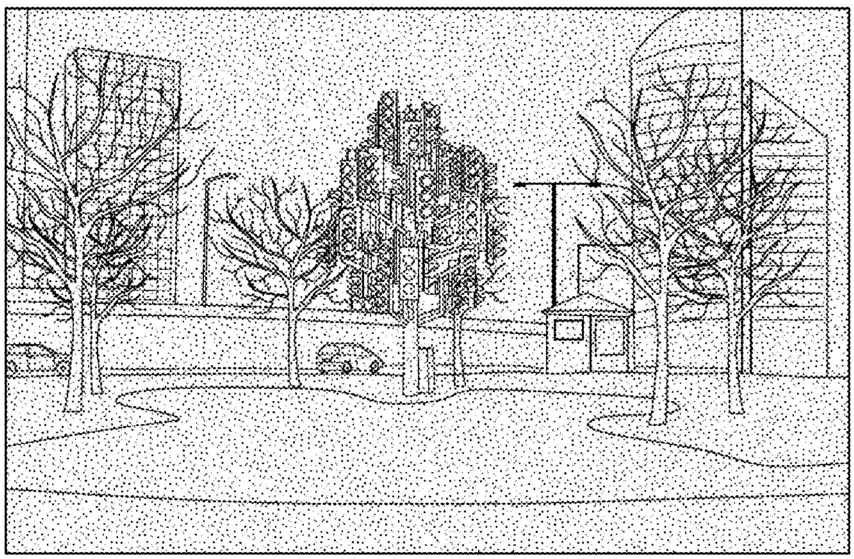
FIG. 6 shows a grayscale image from a vehicle camera, which contains a work of art, which can lead to an unexpected situation during the evaluation.

FIG. 6 schematically shows a grayscale image which displays unexpected effects of modern art at a road traffic island. The work of art "Traffic Light Tree," 5TG, Trafalgar Way, Blackwall, London, Great Britain is depicted.

The modern work of art consists of multiple traffic lights. These do not serve to regulate traffic. Camera-based traffic light recognition would be overwhelmed by assigning traffic-regulating information to this work of art.

Further aspects and exemplary embodiments are described below:

The transition from assisted to autonomous driving constitutes a technical hurdle. An autonomous system also has to master complex scenarios which have possibly not been covered by the simulation or test runs. In this case, the objective is that the surroundings sensing works reliably for vehicle functions at all times and in as many scenarios as possible-ideally all scenarios.

In order to solve this problem, we propose an additional monitor system, that is to say a non-safety-critical system which automatically obtains these complex and relevant data for development from real road traffic. Since the "relevant" data can shift continually with each software version, it is moreover advantageous that the system is capable of being updated and additionally has versioning regarding the raw data. In detail, the appearance of the overall system is as follows:

- The vehicle function to be implemented or monitored is extended by a second independent monitor system which is based on the same data. The monitor system is, consequently, likewise adjusted when adjustments are made to the vehicle function.
- In operation, the monitor system subsequently continually monitors the coverage of the current situation in relation to the data covered by the system. If this results in a sufficient deviation, e.g. via threshold value regulation, the data are sensed for development and transmitted for the enhancement of the vehicle function. To this end, the monitor system can assess the entire scene acquired by one or more sensors or sections of a scene, e.g. individual objects.
- In addition to the raw data, this data package also contains meta information such as the current software version, calculated scores of the monitor system on the relevance of the data, GPS information, date, VIN (vehicle identification number), or connected-vehicle-cloud data. Based hereon, the scene can be reproduced exactly during development (simulation with the same software version). Thanks to this information gain, unknown scenarios and edge cases can be selected and flow directly into the development process of the vehicle function. As a result, a continual quality assurance process can be established. With each development step, more and more relevant data flow into the system.
- Additionally, the degree of maturity of the software can also be derived via the number of incoming data transmissions.

Extension to Multi-Sensor/Multi-Network Setup

In this case, the proposed monitor system considers a sensor setup for vehicles in the context of assisted and autonomous driving. This can optionally be extended to a multi-sensor setup. The advantage of multi-sensor systems is that they increase the certainty of detection algorithms for road traffic by verifying the detections of multiple sensors.

In this case, multi-sensor systems can be any combination of:

one or more cameras, one or more radars, one or more ultrasonic systems, one or more lidars, and/or one or more microphones.

In this case, a multi-sensor system consists of at least two sensors. The data acquisition of one of these sensors s at time t is designated below with D_(s,t). The data D can be images and/or audio recordings, as well as measurements of the angle, distance, speed and reflections of objects in the environment.

Functioning

The described monitor system (or not-safety-critical system) is realized by an autoencoder. This is developed based on the same data as the detection algorithm under consideration or function. The autoencoder can be realized in different ways. One possibility is the parallel use of an autoencoder in addition to the detection algorithm, another possibility is the realization as an additional detector head, i.e., the use of a common encoder for detection and autoencoder. Use as a subsequent system would also be conceivable, that is to say a monitor system which starts after the environment has been detected.

Thanks to its functional principle, the autoencoder offers a significant advantage over other approaches. This is illustrated using the example of image data:

If an image is given to the autoencoder, it tries to reproduce the image in the output. Consequently, the autoencoder can be trained exclusively with the input signal without using additional labels. On the one hand, this offers the advantage that there is no additional outlay in annotation terms and, on the other hand, offers the decisive advantage that an error can be determined in a quantified manner at any time (even on unknown data) in relation to the input data. In this case, there is the possibility of suitable thresholding. The autoencoder can be applied to the entire image or to partial sections.

Consequently, the autoencoder can measure its own error with every possible input signal. In general, higher error values are to be expected with machine learning methods in input data which do not sufficiently match the training data. The fact that the autoencoder and the detection function are based on the same data results in the following advantage: unknown or uncertain scenarios identified by the autoencoder indicate that these scenarios are not adequately contained in the training data and, consequently, are relevant to a wide-reaching coverage of traffic scenarios in function development.

Extension by an Uncertainty Measure

In addition to the autoencoder's output, which estimates the reconstruction certainty of the network, a measure of the certainty with which the autoencoder makes its decision is, furthermore, relevant. This so-called certainty measure is a supplement to the autoencoder output and is in particular relevant if the fusion of the autoencoder output via different sensors is considered and/or the temporal fusion of the autoencoder outputs.

Such a certainty measure can be calculated via statistical calibration or uncertainty estimation. The following are suitable for this:

a) Statistical calibration methods which weigh the outputs of the autoencoder in such a way that these represent a probabilistic uncertainty. This method is suitable when hardly any computing resources are available.

b) However, if sufficient computing resources are available, model uncertainties can be estimated: for example, by extending individual network layers by Monte Carlo dropout. Consequently, at runtime, these network layers and the following ones are repeatedly calculated m times, with a randomized activation of the individual neural layers. Consequently, this results in a set of outputs y_i (i=1 . . . m).

c) Furthermore, a measurement uncertainty can be estimated, e.g., by adding a regularization to the error function (Loss; $Loss_2$), which measures the measurement uncertainty at runtime.

The extension in order to ascertain unknown or uncertain scenes by an uncertainty estimate makes it possible to assess scenes in which the classifier does indeed make a correct decision, but this decision is associated with a large degree of uncertainty. By adding the uncertainty estimate, the robustness of the search for unknown scenes is extended by the search for uncertain scenes. Consequently, both unknown scenes and scenes uncertain for the network can be selected with this architecture.

Extension to Include Temporal Consistency

As described above, the autoencoder offers the possibility of identifying data which are insufficiently illustrated in the training data. Combining this principle with the idea of temporal consistency results in further added value. Thus, if the identified data are filtered in terms of time and a distinction is made between continually occurring sample data and only isolated outliers, valuable additional information is obtained.

Fleeting outliers could thus, e.g., indicate sensory causes. Thus, when entering a tunnel, the white balance of the camera could fluctuate greatly for individual points in time t. These data would be of relevance to the respective sensor development.

If the identified data occur continually, there is a high probability that it is an unknown scenario which is of relevance to the algorithm development.

The following advantages result from the indicated embodiments and aspects:

Particular advantage: runtime optimized

Can be applied to any sensor data as well as combinations of these

Simple integration in the development process, no separate data acquisition necessary Higher coverage than event-based approaches which only monitor the output of a vehicle function such as, for example, the loss of an object track Automatic selection of data specifically relevant to the algorithm under consideration Identification of real scenarios which can only be reproduced with difficulty (accidents, unlikely combinations of events, . . . )

The invention claimed is:

1. A vehicle data system operable during vehicle operation, comprising:

an environment-sensing sensor configured to acquire input data representing an environment of a vehicle; and a data processor operatively coupled to the environment-sensing sensor, the data processor comprising:

an environment detection system configured to:

receive the input data from the environment-sensing sensor, evaluate the input data using a first trained artificial neural network (ANN), and output environment detection data to a controller configured to perform assisted or automated driving of the vehicle; and a monitor system configured to:

receive the same input data from the environment-sensing sensor, evaluate the input data using a second trained ANN different from the first trained ANN, output reconstruction data, establish a deviation between the reconstruction data and the input data, and in response to the deviation exceeding a threshold value during vehicle operation, transmit the input data to a separate data unit, wherein the separate data unit is configured to store the transmitted input data.

2. The vehicle data system according to claim 1, wherein the second ANN comprises an autoencoder.

3. The vehicle data system according to claim 1, wherein the monitor system calculates a score which estimates a relevance of the input data based on the deviation.

4. The vehicle data system according to claim 1, wherein the first ANN has been trained on the basis of predefined training data, wherein nominal output data Y_1, Y_2, . . . , Y_n have been used in each case regarding input data X_1, X_2, . . . , X_n and a first error function has been minimized by adjusting weights of the first ANN, which indicates deviations between outputs of the first ANN for the input data X_1, X_2, . . . , X_n from corresponding nominal output data Y_1, Y_2, . . . , Y_n.

5. The vehicle data system according to claim 1, wherein the second ANN has been trained by adjusting weights of the second ANN, wherein a second error function is minimized which indicates the deviation between the reconstruction data and the input data from the environment-sensing sensor.

6. The vehicle data system according to claim 1, wherein, in addition to the input data from the environment-sensing sensor, meta information is transmitted to the separate data unit, wherein the meta-information corresponds to one or more items selected from the group consisting of: current software version, calculated scores of the monitor system, GPS data, date, time, vehicle identification number, and cloud data.

7. The vehicle data system according to claim 1, wherein the environment detection system is further configured to receive the input data from a plurality of environment-sensing sensors and to evaluate the input data jointly.

8. The vehicle data system according to claim 1, wherein the monitor system is further configured to process the input data from the environment-sensing sensor in parallel to the environment detection system.

9. The vehicle data system according to claim 1, wherein the monitor system is integrated in the environment detection system as an additional detector head, and wherein the monitor system and the environment detection system utilize a common encoder.

10. The vehicle data system according to claim 1, wherein the input data from the environment-sensing sensor are image data and wherein the monitor system is further configured to reconstruct an entire image of the image data or a partial section of the image.

11. The vehicle data system according to claim 1, wherein the monitor system is further to ascertain and output an uncertainty measure, wherein the uncertainty measure indicates how certain the monitor system is during the output of the reconstruction data.

12. The vehicle data system according to claim 1, wherein the monitor system is further configured to take account of a temporal consistency of the reconstruction data.

13. The vehicle data system according to claim 12, wherein a distinction is made as to whether a deviation between the reconstruction data-X from the monitor system and the input data occurs continually or only for limited periods of time.

14. The vehicle data system according to claim 1, wherein the environment detection system and the monitor system are further configured to be updated wirelessly.

15. The vehicle data system according to claim 1, wherein the monitor system is a non-safety-critical monitoring system.

16. The vehicle data system according to claim 1, wherein the separate data unit is remote from the vehicle.

17. A method implemented in a vehicle during vehicle operation, comprising:

receiving input data from an environment-sensing sensor;

evaluating the input data, by an environment detection system, using a first trained artificial neural network (ANN);

outputting environment detection data, by the environment detection system, to a controller configured to perform assisted or automated driving of the vehicle;

evaluating the same input data, by a monitor system, using a second trained ANN different from the first ANN;

outputting reconstruction data by the monitor system;

establishing a deviation, by the monitor system, between the reconstruction data and the input data; and in response to the deviation exceeding a threshold value during vehicle operation, transmitting the input data, by the monitor system, to a separate data unit configured to store the transmitted input data.

18. The method according to claim 17, wherein the second trained artificial neural network comprises an autoencoder.

19. The method according to claim 17, further comprising transmitting meta information associated with the input data to the separate data unit.

* * * * *